United States Patent
Petri Ortega et al.

(10) Patent No.: US 11,411,487 B2
(45) Date of Patent: Aug. 9, 2022

(54) OUTPUT FILTER FOR A POWER CONVERSION SYSTEM AND POWER CONVERSION SYSTEM

(71) Applicant: INGETEAM POWER TECHNOLOGY, S.A., Bizkaia (ES)

(72) Inventors: Alberto Petri Ortega, Sarriguren (ES); Carlos Girones Remirez, Sarriguren (ES)

(73) Assignee: INGETEAM POWER TECHNOLOGY, S.A., Bizkaia (ES)

( * ) Notice: Subject to any disclaimer, the term of this patent is extended or adjusted under 35 U.S.C. 154(b) by 123 days.

(21) Appl. No.: 16/065,941

(22) PCT Filed: Dec. 29, 2015

(86) PCT No.: PCT/ES2015/070958
§ 371 (c)(1),
(2) Date: Jun. 25, 2018

(87) PCT Pub. No.: WO2017/114980
PCT Pub. Date: Jul. 6, 2017

(65) Prior Publication Data
US 2020/0169162 A1    May 28, 2020

(51) Int. Cl.
*H02M 7/49* (2007.01)
*H02M 1/12* (2006.01)
(Continued)

(52) U.S. Cl.
CPC .......... *H02M 1/126* (2013.01); *H01F 27/24* (2013.01); *H01F 27/28* (2013.01); *H02M 7/493* (2013.01); *H02M 7/537* (2013.01)

(58) Field of Classification Search
CPC ...... H02M 1/126; H02M 7/493; H02M 7/537; H01F 27/28
See application file for complete search history.

(56) References Cited

U.S. PATENT DOCUMENTS

| 9,083,234 B2 * | 7/2015 | Shudarek .............. H02M 1/126 |
| 2007/0211507 A1 | 9/2007 | Ilic |

(Continued)

FOREIGN PATENT DOCUMENTS

| CN | 104079195 A | * | 10/2014 |
| CN | 104079195 A | | 10/2014 |

OTHER PUBLICATIONS

D. Zhang, F. Wang, R. Burgos, R. Lai, D. Boroyevich; "Impact of Interleaving on AC Passive Components of Paralleled Three-Phase Voltage-Source Converters"; 2010; IEEE; IEEE Transactions on Industry Applications; pp. 1042-1054 (Year: 2010).*

(Continued)

*Primary Examiner* — Thienvu V Tran
*Assistant Examiner* — Shahzeb K Ahmad
(74) *Attorney, Agent, or Firm* — Sughrue Mion, PLLC (57) ABSTRACT

An output filter for a power conversion system having a plurality of power converters connected in parallel, the output filter including a magnetic core and a plurality of filtering windings each wound around a corresponding one of a plurality of segments of the magnetic core and corresponding to one of the plurality of power converters, each of the plurality of filtering windings including a free-end configured for connection to an output of a corresponding one of the plurality of power converters and a second end, the second ends of all of the filtering windings being electrically connected to each other in a common connection; at least one additional winding wound around the additional segment of the magnetic core, the additional winding having a free-end for being connected to an electrical grid and a second end connected to the common connection.

24 Claims, 9 Drawing Sheets

(51) Int. Cl.
*H01F 27/24* (2006.01)
*H01F 27/28* (2006.01)
*H02M 7/493* (2007.01)
*H02M 7/537* (2006.01)

(56) References Cited

U.S. PATENT DOCUMENTS

| | | | | |
|---|---|---|---|---|
| 2007/0258273 | A1* | 11/2007 | Engelage | H02M 1/126 363/44 |
| 2013/0301327 | A1* | 11/2013 | Wagoner | H02M 7/493 363/132 |
| 2015/0349662 | A1* | 12/2015 | Jiang | H02M 7/493 363/71 |
| 2017/0133947 | A1* | 5/2017 | Fu | H02M 7/487 |

OTHER PUBLICATIONS

International Search Report for PCT/ES2015/070958 dated Oct. 11, 2016 [PCT/ISA/210].
Written Opinion for PCT/ES2015/070958 dated Oct. 11, 2016 [PCT/ISA/237].

* cited by examiner (Prior Art)

OUTPUT FILTER FOR A POWER CONVERSION SYSTEM AND POWER CONVERSION SYSTEM

FIELD

The present application describes various exemplary embodiments related to output filters for power conversion systems having a plurality of power converters connected in parallel

BACKGROUND

With the increase of unitary power of power generation units, it is becoming more and more common the use of conversion topologies based on paralleled power converters in renewable energy generation systems, such as wind turbines or photovoltaic systems. Together with the technology development, the grid codes have become more demanding, and requirements and recommended practices have been established regarding the power quality delivered to the grid.

It is known that power converters produce output currents and voltages that include harmonic components at the switching frequency (SWF) of the power converters and its multiples. With the objective of limiting those harmonic components below certain maximum values, the installation of output passive filters such as LC or LCL filters at the output of the power converters is commonly known, as shown for example in FIG. 1, and several solutions have been analyzed related to the design of said type of output passive filters. Said solutions include a first reactor comprising an inductance $L_{inv}$, for each power converter AC/DC connected in parallel, a RC branch, and a second reactor comprising an inductance $L_{grid}$ to be connected to the grid.

In a conversion system comprising a plurality of parallel-coupled power converters, each one including a machine side converter (MSC) and a grid side converter (GSC), each grid side converter is responsible of injecting to the grid an alternating current which represents a fraction of the total current injected to the grid. These currents are known as normal-mode currents, and mainly comprise differential mode (DM) currents (current flowing from the DC side of the system to each DC/AC grid side power converter through the grid side inductances, that are finally fed into the electrical grid).

In these power conversion systems, it is usual to use modulation strategies to reduce the total harmonic content at the output voltages and currents, in order to minimize the size of the components of the output passive filter. A commonly used method is the one known as interleaving, in which a phase shift between the switching patterns of different converters allows minimizing or even eliminating some harmonic components depending on the value of the phase shift, resulting in a reduced harmonic spectrum of the output electrical signals.

However, one of the drawbacks of parallelizing power converters when using interleaving is that uncontrolled crossed currents that circulate between the converters could appear. These currents are the result of unbalances between the output voltages of each parallel-coupled power converters due to unequal instantaneous voltage in each power converter. A net voltage across parallel converters is what causes circulating crossed-currents in the crossed-mode, which are comprised by differential mode (DM) and common mode (CM) currents, the latter only when a common-mode path is available for the currents to flow. This issue becomes more serious when the switching patterns of the different Grid Side Converters (GSC) differ, as occurs in interleaving, leading to high-value crossed-currents if counter-measures are not taken.

Figure 1:
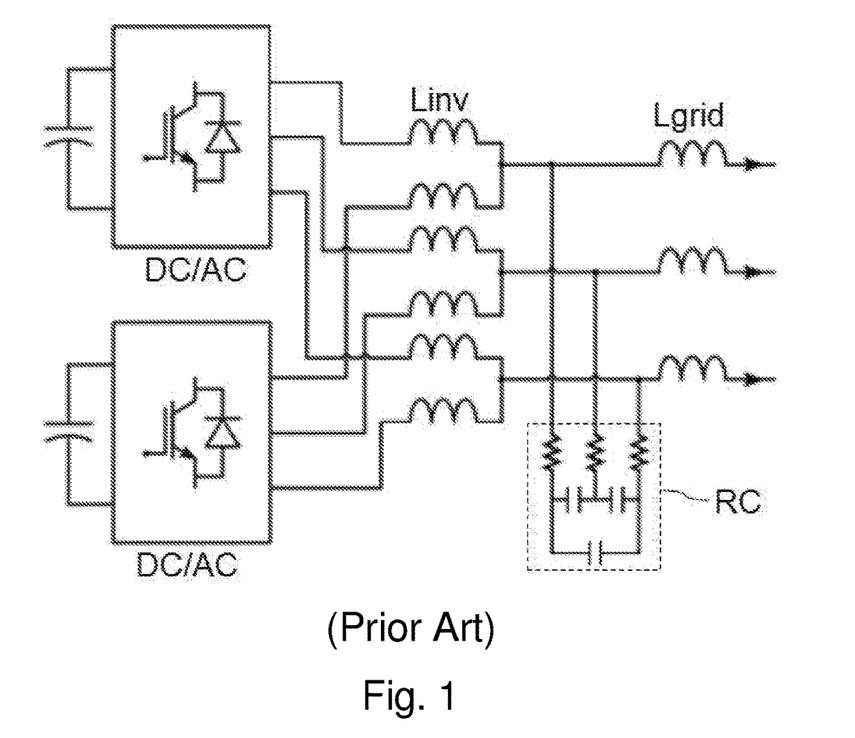
FIG. 1 shows schematically the arrangement of passive filters of the prior art, connected to the output of the power converters connected in parallel.

With the aim of balancing the current share between the parallel connected converters and limiting the crossed currents, when using interleaving, the use of two-limb Inter-phase reactors (IPR) is known, where two windings are wounded around the same magnetic core. An example is disclosed in the document "*Impact of interleaving on AC passive components of paralleled three-phase voltage-source converters. Zhang et al., 2010*", where a solution including Inter-phase reactors disposed at the output of the power converters connected in parallel is disclosed. The windings around these reactors are configured in series-aiding, which allows providing a high impedance path to crossed currents, thus limiting the circulation of crossed currents between the different power converters. However, for high power applications in which the SWF must be low in order to stay below the thermal limit of the switches of the power converter, the leakage inductance of these IPRs could not be enough for normal mode current filtering and regulation. To solve this problem, it is known to include an additional inductance at the output of the power converters, having an LCL filtering structure, as it is shown in FIG. 1. However, when dealing with high power applications where the switching frequency of the power converters must be decreased, a higher inductance could be required, which implies a higher inductance volume that could not be adequate for some applications. Thus, the solution based on IPRs disclosed is mainly limited to low power applications where the SWF is around tens of thousands of Hertz.

In the patent document US2013301327A1 an output filter is proposed including one or more winding-less magnetic core limbs that provide a path through the magnetic core for the leakage flux, thus increasing the output leakage inductance. However, although the use of additional limbs provides a high enough inductance for normal current filtering, the inductance will still have a higher volume that could not be adequate for some applications, in particular to applications requiring high power, due to the size and cost increase.

SUMMARY

An aspect of various non-limiting exemplary embodiments of the invention is to provide an output filter for a power conversion system comprising a plurality of power converters connected in parallel, and a power conversion system comprising a plurality of power converters connected in parallel and at least one output filter connected to the output of said power converters, as defined in the claims.

The output filter is adapted for a power conversion system comprising a plurality of power converters connected in parallel, and comprises a magnetic core for said power converters, and at least one filtering winding for each of said power converters. Each filtering winding is wounded on a corresponding segment of the magnetic core, and comprises a free-end for being connected to an output of a corresponding power converter of the system, and a second end. The second ends of all the filtering windings are electrically connected to each other in a common connection, preferably a same connection point.

The output filter further comprises at least one additional winding wounded on a corresponding additional segment of the magnetic core, said additional segment being different from the segments on which the filtering windings are wounded. Said additional winding comprises a free-end for, preferably, being connected to an electrical grid, and a second end connected to the common connection at which the second ends of the filer windings are connected.

The proposed output filter is valid for both low and high power applications, since its inductance could be easily varied by including more or less number of turns of at least one of the windings wounded on the magnetic core. In case a higher impedance for normal current filtering is required, the number of turns of the corresponding winding over the additional segment, and/or over each segment of the magnetic core could be increased. In case a higher impedance for crossed currents filtering is required, the number of turns of the corresponding winding over each segment of the magnetic core could be increased. Besides, the values of the different equivalent inductances are adaptable and easily varied depending on the power converter topology or electrical grid characteristics, by changing the number of turns of at least one of the windings wounded on the magnetic core.

In addition, with the proposed output filter the volume and cost of an output filter for such systems are optimized in comparison with the solutions proposed in the prior art, since the filter is integrated in a single core (a single reactor, the magnetic core), said output filter providing a compact and efficient solution.

These and other advantages and features of various embodiments will become evident in view of the drawings and the detailed description of the exemplary embodiments.

DESCRIPTION OF THE DRAWINGS

FIG. 6b shows an equivalent diagram of a phase of the output filter of FIG. 6a.

DETAILED DESCRIPTION OF EXEMPLARY EMBODIMENTS OF THE INVENTION

Figure 2:
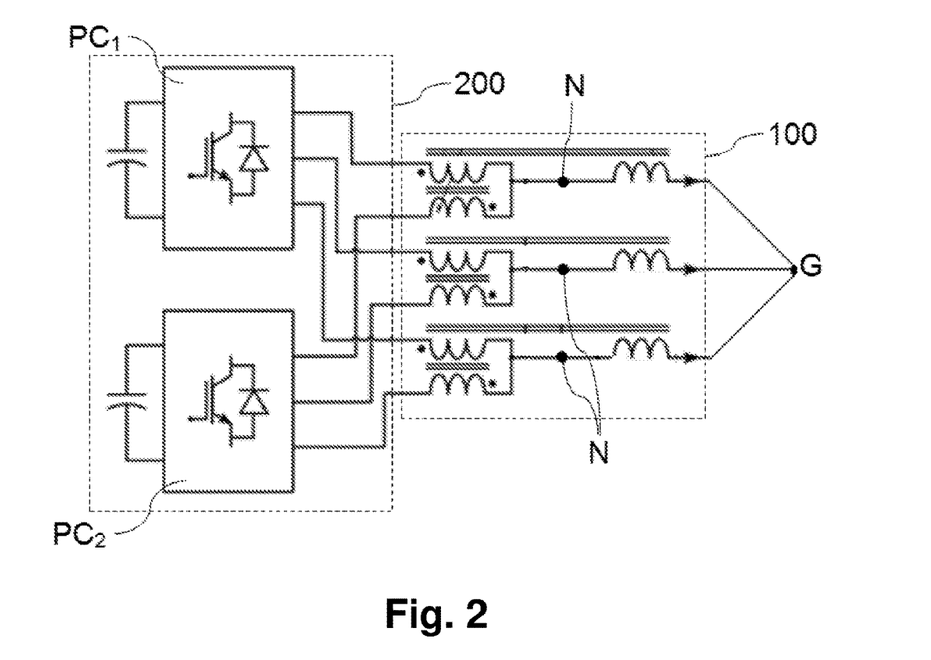
FIG. 2 shows schematically an embodiment of the output filter of an embodiment of the invention, connected to a power conversion system comprising two power converters connected in parallel.

According to a non-limiting exemplary embodiment, an output filter 100 is adapted for power conversion systems 200 comprising a plurality of power converters $PC_1$, $PC_2, \ldots, PC_n$ connected in parallel, as the one shown by way of example in FIG. 2, which comprises two power converters $PC_1$ and $PC_2$ connected in parallel. In this case the power converters $PC_1$ and $PC_2$ are DC/AC converters, but other kind of converters could also be possible. The output filter 100 is disposed between the system 200 and, preferably, an electrical grid G, it being connected to an output of each of said power converters $PC_1$ and $PC_2$, and to said electrical grid G.

Figure 8A:
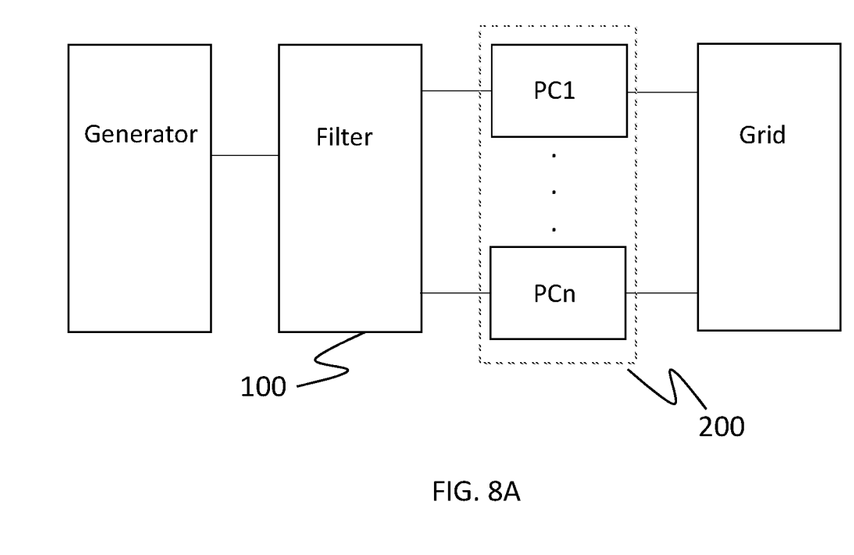
FIG. 8A shows an example of an output filter connected between a plurality of power converters and a generator.
Figure 8B:
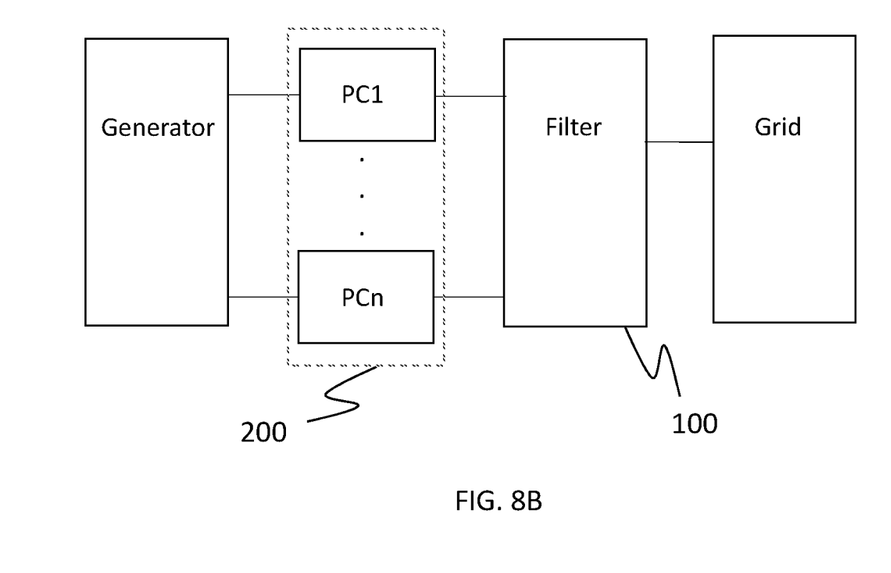
FIG. 8B shows an example of an output filter connected between a plurality of power converters and an electrical grid.
Figure 9:
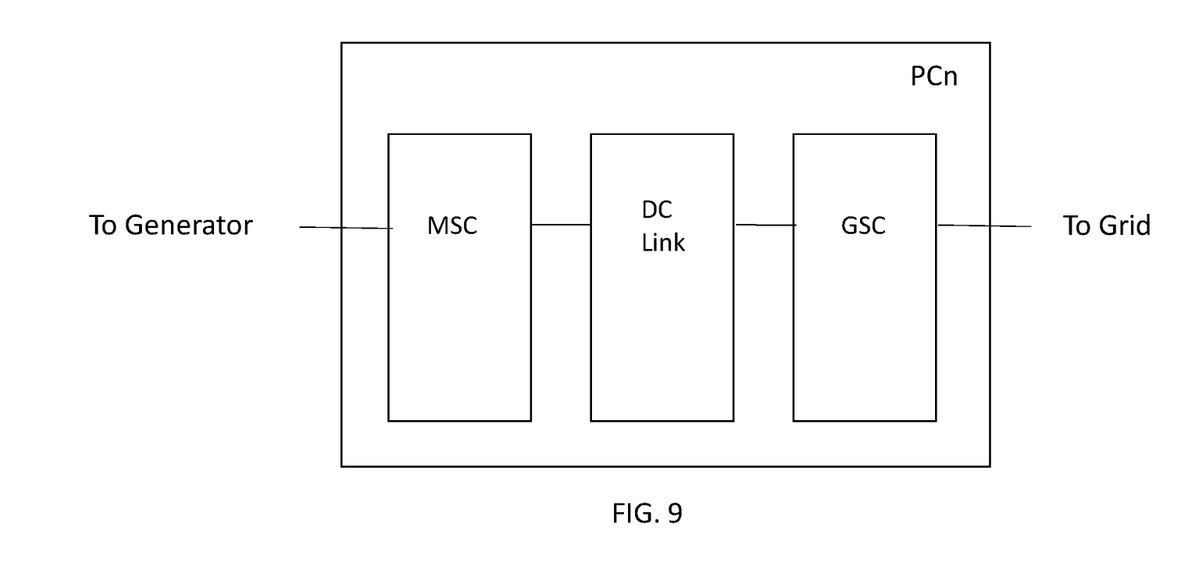
FIG. 9 shows an example embodiment of a power converter having a machine side converter (MSC) connected to a grid side converter (GSC) through a DC link.

The output filter 100 could also be connected between the system 200 and terminals of a generator, as shown in FIG. 8A. The parallel connected power converters PC1, PC2, ..., PCn could then take part in a system including also at least one generator (not represented in Figures), and at least one power converter PC1, PC2, ..., PCn associated to the generator. As shown in FIG. 9 each power converter PC1, PC2, ..., PCn comprises a generator side converter, or machine side converter (MSC), connected to the generator and a grid side converter (GSC) connected to each generator side converter through a DC link. In each case, the AC output terminals of the generator side converter of the corresponding power converter PC1, PC2, ..., PCn would be connected to the generator, and the AC output terminals of the grid side converter would be connected to the electrical grid G. An output filter 100 could be connected between the outputs of the power converters PC1, PC2, ..., PCn and the generator, as shown in FIG. 8A, or the electrical grid G, as shown in FIG. 8B.

Figure 3:
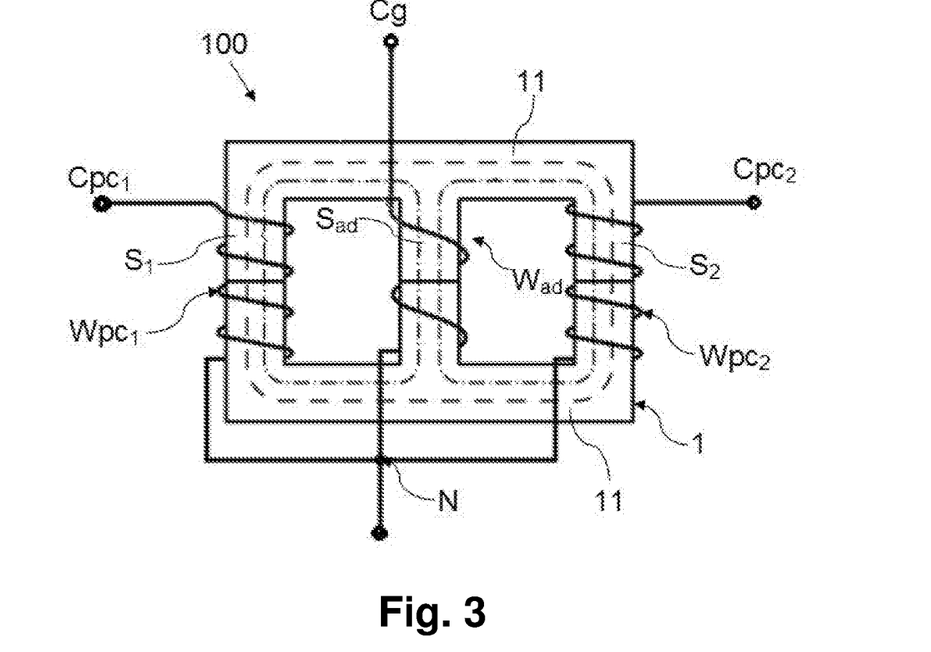
FIG. 3 shown the output filter of FIG. 2.

Generally speaking, the output filter 100 is connectable to a number of power converters $PC_1, PC_2, \ldots, PC_n$ connected in parallel, and comprises a magnetic core 1 for all of these power converters $PC_1, PC_2, \ldots, PC_n$, as shown in FIG. 3 by way of example. The output filter 100 also comprises at least one filtering winding $Wpc_1, Wpc_2, \ldots, Wpc_n$ for each one of said power converters $PC_1, PC_2, \ldots, PC_n$, wounded around a part of said magnetic core 1. Preferably, the output filter 100 comprises a number of filtering windings $Wpc_1, Wpc_2, \ldots, Wpc_n$ equal to the number of power converters $PC_1, PC_2, \ldots, PC_n$ to which it is connectable or connected (therefore, only one filtering winding $Wpc_1, Wpc_2, \ldots, Wpc_n$ per power converter $PC_1, PC_2, \ldots, PC_n$).

Each filtering winding $Wpc_1, Wpc_2, \ldots, Wpc_n$ is wounded around a corresponding segment $S_1, S_2, \ldots, S_n$ of the magnetic core 1, as shown in the example of FIG. 3, such that the filtering windings $Wpc_1, Wpc_2, \ldots, Wpc_n$ are not overlapped. Each filtering winding $Wpc_1, Wpc_2, \ldots, Wpc_n$ comprises a respective free-end $Cpc_1, Cpc_2, \ldots, Cpc_n$ for being connected to the output of the corresponding power converter $PC_1, PC_2, \ldots, PC_n$, and a respective second end opposed to its free-end $Cpc_1, Cpc_2, \ldots, Cpc_n$. The second ends of all the filtering windings $Wpc_1, Wpc_2, \ldots, Wpc_n$ of the output filter 100 wounded around the same magnetic core 1 are electrically connected to each other in a common connection N, preferably in a same connection point.

The output filter 100 further comprises, in any embodiment, at least one additional winding $W_{ad}$ wounded around an additional segment $S_{ad}$ of the magnetic core 1, as also shown in the example of FIG. 3. Said additional winding $W_{ad}$ does not overlap any of the filtering winding $Wpc_1, Wpc_2, \ldots, Wpc_n$, and it is not either overlapped by any of said filtering windings $Wpc_1, Wpc_2, \ldots, Wpc_n$. The additional winding $W_{ad}$ comprises a free-end $C_g$ for being connected, preferably, to an electrical grid G, and a second end opposed to the free-end $C_g$. Said second end is electrically connected to the common connection N to which the second ends of the filtering windings $Wpc_1, Wpc_2, \ldots, Wpc_n$ are also connected, preferably in the same common connection point N.

Therefore, the filtering windings $Wpc_1, Wpc_2, \ldots, Wpc_n$, the additional winding $W_{ad}$ and the magnetic core 1 form a single inductor or reactor, said single inductor or reactor being the output filter 100 itself.

When the output filter 100 is connected to the outputs of a plurality of power converters $PC_1, PC_2, \ldots, PC_n$ and to an electrical grid G, thanks to its configuration (thanks in particular to the windings $Wpc_1, Wpc_2, \ldots, Wpc_n$ and $W_{ad}$), a first path is provided for the normal current from the power converters $PC_1, PC_2, \ldots, PC_n$ to the electrical grid G, said first path comprising a corresponding normal impedance $L_{normal}$, and a second path is provided for the crossed current between the power converters $PC_1, PC_2, \ldots, PC_n$, said second path comprising a corresponding crossed impedance $L_{cross}$. Both impedances $L_{normal}$ and $L_{cross}$ are mainly inductive.

The crossed impedance $L_{cross}$ in an output filter 100 connected to two power converters $PC_1$ and $PC_2$, between the power converters $PC_1$ and $PC_2$, can be calculated as follows (considering it mainly inductive):

$$L_{cross} = (L_{a1} + L_{a2}) + 2(L_{m1} - L_{12}) \quad (1)$$

wherein:
- $L_{a1}$: air leakage inductance of the first filtering winding $Wpc_1$,
- $L_{a2}$: air leakage inductance of the second filtering winding $Wpc_2$,
- $L_{m1}$: magnetic inductance of the first filtering winding $Wpc_1$,
- $L_{12}$: mutual inductance between the filtering windings $Wpc_1$ and $Wpc_2$.

The normal impedance $L_{normal}$ in an output filter 100 connected to two power converters $PC_1$ and $PC_2$, between each power converter $PC_1$ and $PC_2$ and the electrical grid G, can be calculated as follows (considering it mainly inductive):

$$L_{normal} = (L_{a3} + L_{a1}/L_{a2}) + (L_{m1} - L_{12}) + (L_{m1} - L_{12})/2 + L_{m3} + L_{12} - 2L_{13} \quad (2)$$

wherein:
- $L_{a1}$: air leakage inductance of the first filtering winding $Wpc_1$,
- $L_{a2}$: air leakage inductance of the second filtering winding $Wpc_2$,
- $L_{a3}$: air leakage inductance of the additional winding $W_{ad}$,
- $L_{m1}$: magnetic inductance of the first filtering winding $Wpc_1$,
- $L_{12}$: mutual inductance between the filtering windings $Wpc_1$ and $Wpc_2$,
- $L_{13}$: mutual inductance between the windings $Wpc_1$ and $W_{ad}$.

The equations for calculating the impedance $L_{normal}$ and $L_{cross}$ for an output filter 100 connected to more than two power converters $PC_1$ and $PC_2$ can also be obtained analogously in a known manner for any skilled person, and, therefore, no other options are described.

As it can be seen from the equations (1) and (2), in particular from equation (2), the additional winding $W_{ad}$ also influence over the normal impedance $L_{normal}$ for the normal current, said normal impedance $L_{normal}$ being increased compared with the normal impedance $L_{normal}$ of an output filter of the prior art. Therefore, the proposed output filter 100 also presents a normal impedance $L_{normal}$ that allows filtering said normal current, and, thanks to said normal impedance $L_{normal}$, the windings $Wpc_1, Wpc_2, \ldots, Wpc_n$ and $W_{ad}$ filter the normal current going from the power converters $PC_1, PC_2, \ldots, PC_n$ to the electrical grid G. Also, the crossed current between power converters $PC_1, PC_2, \ldots, PC_n$ is filtered by the crossed impedance $L_{cross}$, thanks to the windings $Wpc_1, Wpc_2, \ldots, Wpc_n$. Thus, with the combination of the different windings $Wpc_1, Wpc_2, \ldots, Wpc_n$ and $W_{ad}$, an adequate output filter 100 for both normal mode (differential mode) current and crossed mode (differential and common mode) current is achieved.

Figure 4:
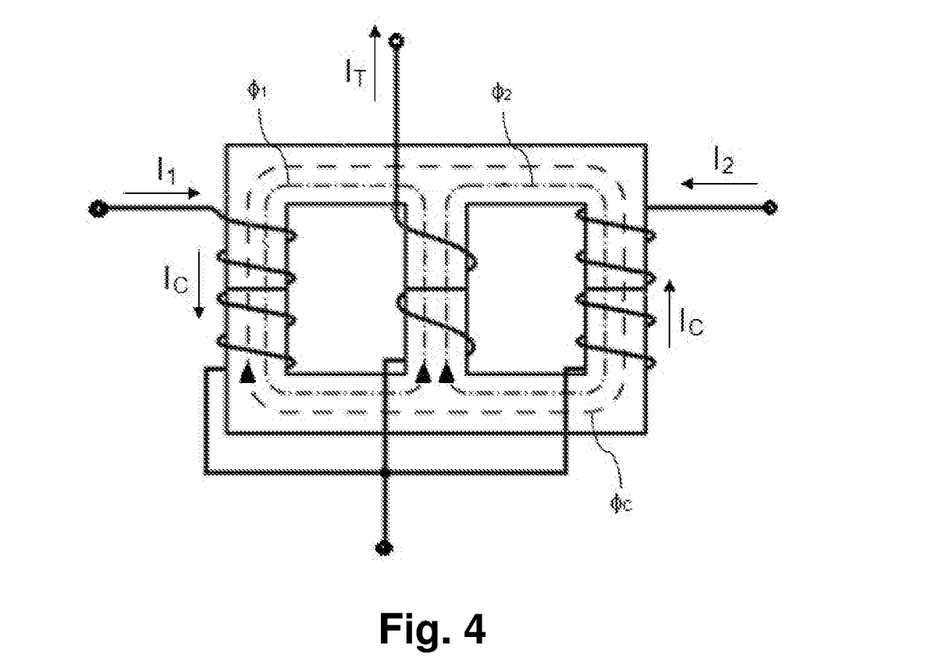
FIG. 4 shows the distribution of the fluxes on the output filter of FIG. 3.

An example of the effect of the output filter 100 is now explained, with reference to FIG. 4, where the configuration of FIG. 3 is shown. The output filter 100 is connected to two power converters $PC_1$ and $PC_2$ and to an electrical grid G, and comprises a filtering winding $Wpc_1$ comprising a first end $Cpc_1$ connected to an output of a first power converter $PC_1$, a second filtering winding $Wpc_2$ comprising an end $Cpc_2$ connected to an output of a second power converter $PC_2$, and an additional winding $W_{ad}$ comprising an end $C_g$ connected to the electrical grid G. The output filter 100 receives a first current $I_1$ from the first power converter $PC_1$ to which it is connected by means of the end $Cpc_1$ of the first filtering winding $Wpc_1$ and a second current $I_2$ from the second power converter $PC_2$ to which it is connected through the end $Cpc_2$ of the second filtering winding $Wpc_2$, and sends a resultant current $I_T$ to the electrical grid G to which it is connected by means of the end $C_g$ of the additional winding $W_{ad}$, where $I_T = I_1 + I_2$. The currents $I_1$ and $I_2$ pass through the corresponding filtering winding $Wpc_1$ and $Wpc_2$, and also through the additional winding $W_{ad}$ (in the form of current $I_T$), and cause a respective flux $\phi_1$ and $\phi_2$ to flow through the magnetic core 1 of the output filter 100 in normal-mode, and a cross-mode current $I_c$ to flow through said magnetic core 1 in cross-mode. Said cross-mode current $I_c$ causes a cross-mode flux $\phi_c$ to flow through said magnetic core 1.

Figure 5:
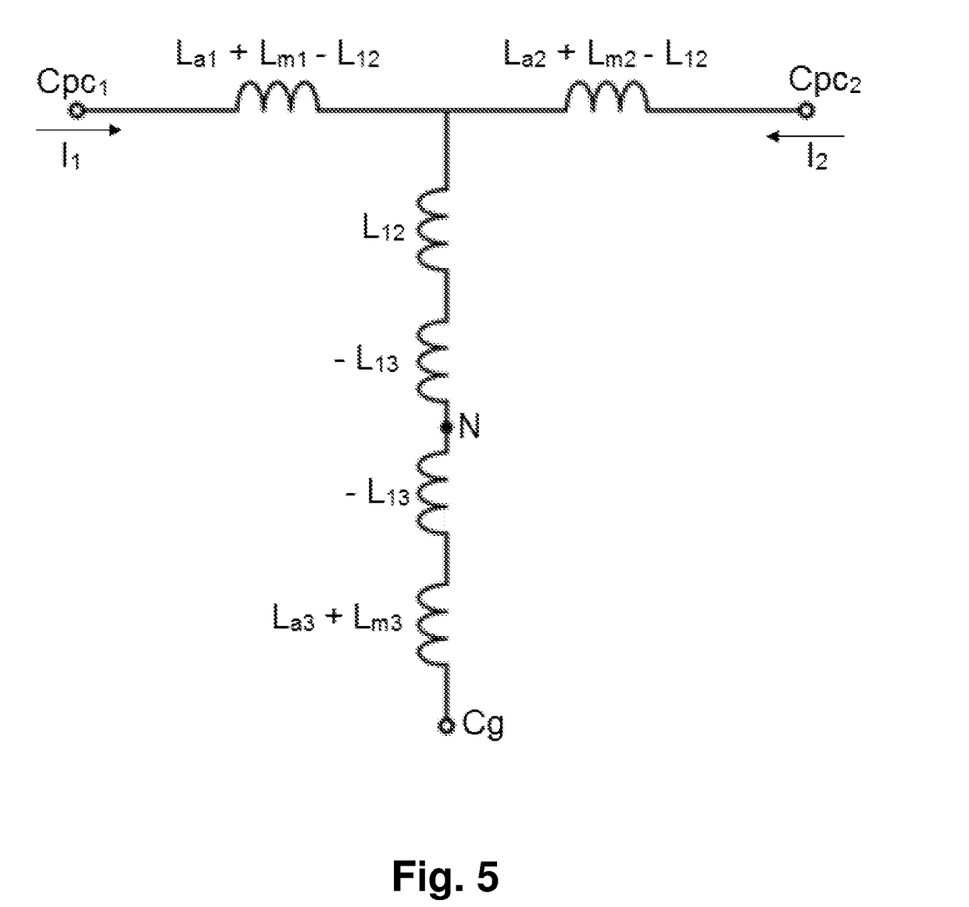
FIG. 5 shows an equivalent diagram of a phase of the output filter of FIG. 3.

FIG. 5 shows equivalent diagram of a phase of the output filter 100, wherein with the normal and crossed mode impedance paths formed by the different impedances according to equations (1) and (2) are shown.

Thus, thanks to the output filter 100, impedances $L_{normal}$ and $L_{cross}$ are generated for both current modes, normal-mode and cross-mode, and it is possible to operate over the current $I_T$ modifying as desired said impedances $L_{normal}$ and $L_{cross}$, in order, for example, to limit the ripple of said current $I_T$ in order to obtain a current $I_T$ with the desired quality.

As it has been commented before, the windings $Wpc_1, Wpc_2, \ldots, Wpc_n$ and $W_{ad}$ are all connected to a common connection N. Said configuration of the output filter 100 allows the common connection N to be connected at different positions of the windings $Wpc_1, Wpc_2, \ldots, Wpc_n$ and $W_{ad}$, which means that, depending of the position of the common connection N, the number of turns of each winding $Wpc_1, Wpc_2, \ldots, Wpc_n$ and $W_{ad}$ around the corresponding segment $S_1, S_2, \ldots, S_n$ and $S_{ad}$ of the magnetic core 1 is different. This ability allows then varying the turns of each winding $Wpc_1, Wpc_2, \ldots, Wpc_n$ and $W_{ad}$ around its corresponding segment $S_1, S_2, \ldots, S_n$ and $S_{ad}$ of the magnetic core 1 to adapt to the specific requirements of each case (resulting then in a variation of the position of the common connection N), as the value of the impedances $L_{normal}$ and $L_{cross}$ varies according to said position, it being possible to offer output filters 100 with different impedances for normal currents and/or cross currents easily.

The value of the impedances $L_{normal}$ and $L_{cross}$ could be adapted according to the requirements of the application for which the power conversion system to which the output filter 100 is connected is designed, the number of power converters $PC_1, PC_2, \ldots, PC_n$ to which said output filter 100 is connected, the switching frequencies applied over said power converters $PC_1, PC_2, \ldots, PC_n$ and/or the characteristics of the electrical grid G or the generator to which said power conversion system is connected, for example.

Figure 7:
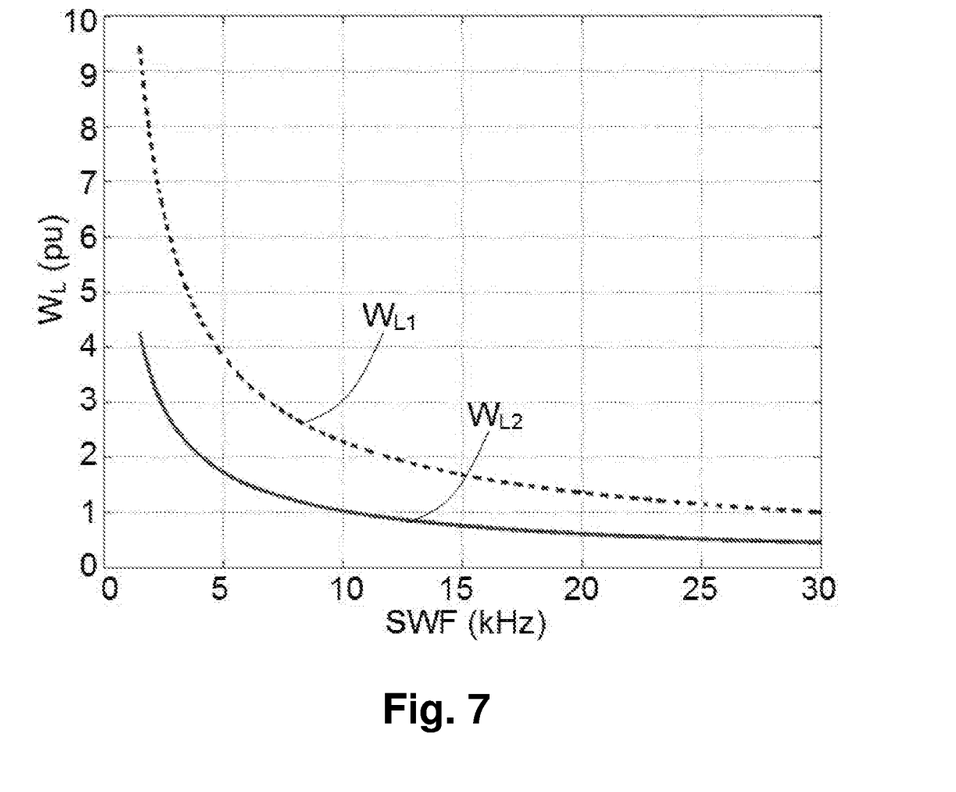
FIG. 7 shows an example of the variation of reactor weights with the switching frequency of the power converters, for a solution to problems with the prior art and for a a non-limiting embodiment of the invention.

The proposed output filter 100 allows combining the differential mode (DM) and common mode (CM) current filtering in a single magnetic element (the magnetic core 1), in a reduced size comparing to the prior art solutions. Besides, the configuration of the output filter 100 also allows to reduce the reactor weights, which implies and additional size reduction. FIG. 7 shows an example of the variation of reactor weights $W_L$ in per unit (Pu) of an output filter connected to two power converters connected in parallel, for different switching frequencies SWF of said power converters, for one embodiment of the prior art based on LCL filtering structures with independent components ($W_{L1}$), and for an exemplary embodiment of the invention ($W_{L2}$). $W_{L1}$ and $W_{L2}$ refer to the equivalent impedance of the corresponding output filter 100. As reference unit it has been considered the weight of the reactor $W_{L1}$ for a switching frequency SWF of 30 kHz. The solution proposed according to the exemplary embodiment allows constructing an integrated output filter 100 with less than half weight than known filtering solutions.

Figure 6A:
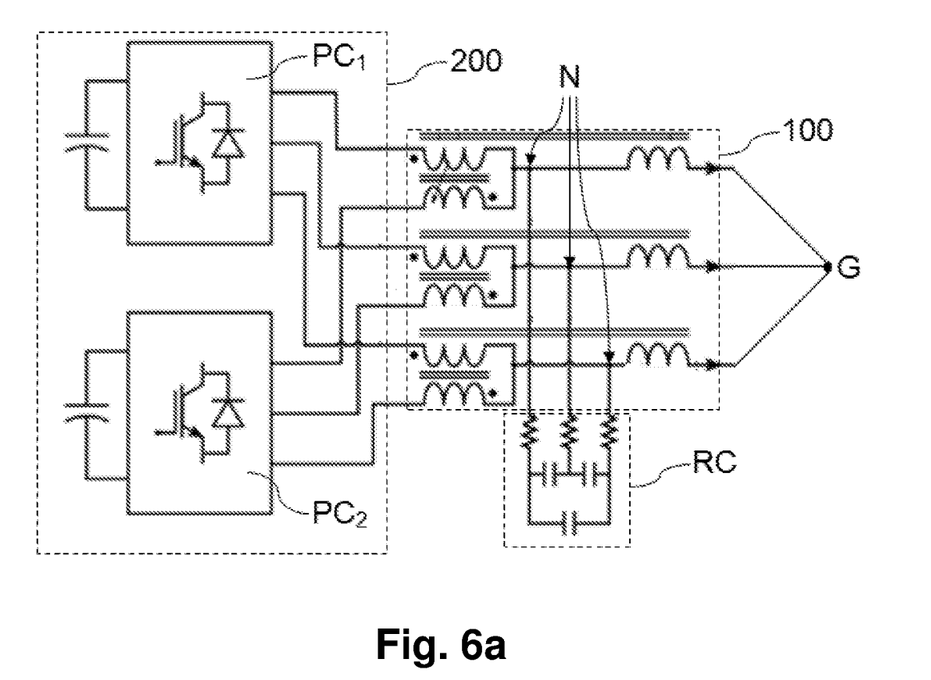
FIG. 6a shows schematically the output filter of FIG. 3, with a RC branch.
Figure 6B:
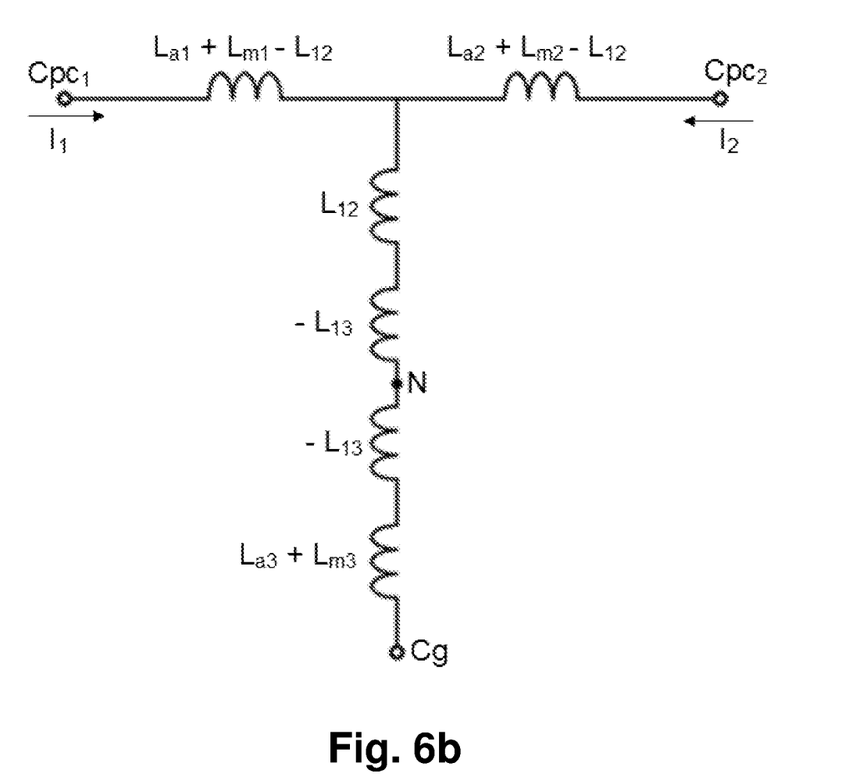

Besides, the output filter 100 allows, in many of its embodiments, to select the position of the common connection N position by changing the number of turns of each winding $Wpc_1, Wpc_2, \ldots, Wpc_n$ and $W_{ad}$, over the corresponding segment $S_1, S_2, \ldots, S_n$ and $S_{ad}$, different impedance values being thus obtained. In addition, the common connection N is accessible, and, for example, a RC branch can be connected to it for filtering the harmonics to the switchings of the power converters $PC_1$ and $PC_2$, as in the example of FIG. 6, said output filter 100 comprising also an RC branch in this case. FIG. 6b shows the single phase equivalent diagram of the branch RC connected at the common connection N. In case of three phase applications, this single phase branches could be connected in delta or wye configuration with the RC branches of the other two single phase filters.

Preferably, the magnetic core 1 comprises a limb $L_1, L_2, \ldots, L_n$ for each filtering winding $Wpc_1, Wpc_2, \ldots, Wpc_n$ and an additional limb $L_{ad}$ for the additional winding $W_{ad}$, as shown in FIGS. 3 and 4 for example. Each segment $S_1, S_2, \ldots, S_n$ and $S_{ad}$ surrounded by a winding $Wpc_1, Wpc_2, \ldots, Wpc_n$ and $W_{ad}$ is, therefore, a corresponding limb $L_1, L_2, \ldots, L_n$ and $L_{ad}$ respectively of the magnetic core 1. Preferably the limbs $L_1, L_2, \ldots, L_n$ and $L_{ad}$ are parallel, but other configurations are also possible in other embodiments of the output filter 100. In addition, the limbs $L_1, L_2, \ldots, L_n$ and $L_{ad}$ are preferably connected to each other with segments 11 of the magnetic core 1 not surrounded by windings.

The output filter 100 can be adapted for a single-phase power conversion system, the windings $Wpc_1, Wpc_2, \ldots, Wpc_n$ and $W_{ad}$ being connected then forming, together with the magnetic core 1, a single-phase reactor. The output filter 100 can also be adapted for a three-phase power conversion system, said windings $Wpc_1, Wpc_2, \ldots, Wpc_n$ and $W_{ad}$ (one per phase) being connected then forming a three-phase reactor together with the magnetic core 1.

While the various embodiments above contain different components and features, upon reading the specification, one skilled in the art readily will realize that such components and features in one embodiment may be incorporated into or combined with components and features of another embodiment. Also, the previous description of the embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents thereof.

The invention claimed is:

1. An output filter for a power conversion system having a plurality of power converters connected in parallel, the output filter comprising:
   a single magnetic core configured for coupling to all of the plurality of power converters in the power conversion system, the magnetic core comprising a plurality of segments and an additional segment different from the plurality of segments;
   a plurality of filtering windings each wound around a corresponding one of the plurality of segments of the magnetic core and corresponding to one of the plurality of power converters, each of the plurality of filtering windings comprising a free-end configured for connection to an output of a corresponding one of the plurality of power converters and a second end, the second ends of all of said filtering windings being electrically connected to each other in a common connection;
   at least one additional winding wound around the additional segment of the magnetic core, said additional winding comprising a free-end for being connected to an electrical grid and a second end connected to the common connection; and
   a filter circuit connected to the common connection, the filter circuit comprising a capacitor.

2. The output filter according to claim 1, wherein the magnetic core comprises a limb for each of the plurality of filtering windings and an additional limb for the additional winding, wherein each segment around which a filter winding is wound is a corresponding one of the limbs of the magnetic core.

3. The output filter according to claim 2, wherein the limbs are parallel.

4. The output filter according to claim 3, wherein the limbs are connected to each other with segments of the magnetic core that are not wound with filter windings.

5. The output filter according to claim 2, wherein the limbs are connected to each other with segments of the magnetic core that are not wound with filter windings.

6. The output filter according to claim 2, wherein the plurality of windings are connected forming a single phase reactor.

7. The output filter according to claim 2, wherein the plurality of windings are connected forming a three phase reactor.

8. The output filter according to any of the claim 1, wherein the plurality of windings are connected forming a single phase reactor.

9. The output filter according to claim 8, wherein a number of turns of the plurality of filtering windings is based on the position of the common connection.

10. The output filter according to any of the claim 1, wherein the plurality of windings are connected forming a three phase reactor.

11. The output filter according to claim 10, wherein a number of turns of the plurality of filtering windings is based on the position of the common connection.

12. The output filter according to any of the claim 1, wherein the plurality of filtering windings and the additional winding provide impedance for normal currents from each of the plurality of power converters to the electrical grid and for crossed currents between the plurality of power converters to which the output filter is connected.

13. The output filter according to claim 12, wherein the normal current from the plurality of power converters to the electrical grid is filtered by the plurality of filtering windings and the additional winding.

14. The output filter according to claim 13, wherein the crossed current between the plurality of power converters is filtered by the plurality of filtering windings.

15. The output filter according to claim 14, wherein the plurality of filtering windings are wound over the segments in a series-aiding configuration, so that circulation of crossed currents between the plurality of power converters that are connected to the output filter is limited.

16. The output filter according to claim 12, wherein a number of turns of the plurality of filtering windings is based on the position of the common connection.

17. The output filter according to claim 1, wherein a number of turns of the plurality of filtering windings is based on the position of the common connection.

18. The output filter according to claim 1, wherein each of the plurality of filtering windings has a same number of turns.

19. The output filter according to claim 1, wherein a number of turns of each of the plurality of filtering windings is based on switching frequencies applied over the plurality of power converters.

20. The output filter according to claim 1, wherein a number of turns of each of the plurality of filtering windings is based on a characteristic of an electrical grid or a generator to which the power conversion system is connected.

21. The output filter according to claim 1, wherein each of the free-ends of the plurality of filtering windings is configured for connection to a single phase of a multi-phase power output.

22. A power conversion system comprising:
a plurality of power converters connected in parallel; and
at least one output filter comprising,
a single magnetic core configured for coupling to all of the plurality of power converters in the power conversion system, the magnetic core comprising a plurality of segments and an additional segment different from the plurality of segments;
a plurality of filtering windings each wound around a corresponding one of the plurality of segments of the magnetic core and corresponding to one of the plurality of power converters, each of the plurality of filtering windings comprising a free-end configured for connection to an output of a corresponding one of the plurality of power converters and a second end, the second ends of all of said filtering windings being electrically connected to each other in a common connection;
at least one additional winding wound around the additional segment of the magnetic core, said additional winding comprising a free-end for being connected to an electrical grid and a second end connected to the common connection, wherein the free-end of each of the plurality of filtering windings is connected to an output of a corresponding one of the plurality of power converters; and
a filter circuit connected to the common connection, the filter circuit comprising a capacitor.

23. The power conversion system according to claim 22, wherein a number of turns of the plurality of filtering windings is based on the position of the common connection.

24. The power conversion system according to claim 22, wherein each of the free-ends of the plurality of filtering windings is configured for connection to a single phase of a multi-phase power output.

* * * * *